United States Patent [19]

Vosper

[11] Patent Number: 4,487,171
[45] Date of Patent: Dec. 11, 1984

[54] INTERNAL COMBUSTION ENGINE HAVING DIVERTER VALVE AND SEPARATE PASSAGE FOR PURGING ENGINE

[76] Inventor: George W. Vosper, 149 Earl St., Kingston, Ontario, Canada, K7L 2H3

[21] Appl. No.: 497,203

[22] Filed: May 23, 1983

[51] Int. Cl.³ .............................................. F01L 1/28
[52] U.S. Cl. .................................. 123/79 R; 123/81 B
[58] Field of Search ................ 123/79 R, 79 A, 79 C, 123/80 R, 81 R, 81 B, 76, 190 B, 190 BD, 190 BF

[56] References Cited

U.S. PATENT DOCUMENTS

| | | | |
|---|---|---|---|
| 1,397,585 | 11/1921 | James | 123/79 R |
| 1,444,857 | 2/1923 | Taub | 123/79 R |
| 1,639,217 | 8/1927 | Dufwa | 123/81 B |
| 1,951,759 | 3/1934 | Keister | 123/79 R |
| 1,970,382 | 8/1934 | Laubender | 123/79 R |
| 2,215,579 | 9/1940 | Eichelberg | 123/76 |
| 3,097,633 | 7/1963 | Klein | 123/79 R |
| 4,075,986 | 2/1978 | Keck | 123/79 R |
| 4,273,083 | 6/1981 | Moiroux | 123/79 R |

Primary Examiner—Ira S. Lazarus
Attorney, Agent, or Firm—Stanley E. Johnson; Richard J. Hicks

[57] ABSTRACT

Improvements in a fuel injected, internal combustion engine having a first passage for flow of air into the combustion chamber and exit of exhaust gases from the combustion chamber and a single poppet valve opened and closed in timed relation to rotation of the engine's crank shaft to control flow of gases through such first passage, an inlet air passage and an exhaust gas passage each communicating with the first passage and one another and a diverter valve movable in timed relation to operation of the poppet valve selectively to direct, in one position, air into the combustion chamber through the inlet passage and, in another position, exit of exhaust gases through the outlet passage wherein the improvement comprises a separate small passageway in parallel flow relation with the intake air into the combustion chamber which directs supercharged air into the combustion chamber when the diverter valve is in the exhaust position to purge the engine.

2 Claims, 5 Drawing Figures

INTERNAL COMBUSTION ENGINE HAVING DIVERTER VALVE AND SEPARATE PASSAGE FOR PURGING ENGINE

CROSS-REFERENCE TO RELATED APPLICATION

This invention is related to applicant's invention disclosed in application Ser. No. 182,029 filed Aug. 28, 1980 and issued to U.S. Pat. No. 4,372,259 on Feb. 8, 1983.

FIELD OF INVENTION

Valve overlap contributes very significantly to the high efficiency of today's supercharged four-stroke internal combustion engines. Overlap is the practice of opening the inlet valve before the end of the exhaust stroke. With the intake and exhaust valves both open, supercharged inlet air is blown through, cooling the cylinder walls while totally purging the combustion products. Perhaps the most serious drawback inherent in all single valve engines is that there has been no way to duplicate either the internal cooling of the cylinder or the positive purge achieved by valve overlap.

This invention relates to an improvement in an internal combustion engine and in particular the class of four-stroke cycle engines using a single poppet valve in the cylinder head for both intake and exhaust and a diverter valve in one position directing air into the cylinder and in another position directing the outflow of exhaust gases. The larger size of poppet valve that this arrangement allows gives it a potential advantage over the conventional two-valve system. The considerably increased area of valve opening to the cylinder when coupled with proportionately enlarged gas passages, can substantially reduce flow friction to and from the cylinders. Thermal efficiency is increased by virtue of the reduced pumping loss, and a higher volumetric efficiency also results from the improved cylinder breathing. The purpose of this invention is to exploit the potential advantage of a single valve engine to its fullest.

BACKGROUND OF INVENTION

Internal combustion engines of the foregoing type are known and as examples of some, reference may be had to the following:

U.S. Pat. Nos.

3,097,633 issued July 16, 1973 to F. Klein
3,424,139 issued Jan. 28, 1969 to D. G. Brooks
1,951,759 issued Mar. 20, 1934 to J. Keister
4,273,083 issued June 16, 1981 to A. Moiroux
4,075,986 issued Feb. 28, 1978 to M. Keck
1,364,482 issued Jan. 4, 1921 to A. Coates et al
1,600,644 issued Sept. 21, 1926 to J. E. Philips
1,639,217 issued Aug. 16, 1927 to F. Dufwa.

In most instances in the known engines, the exhaust port closes before the intake port opens, to prevent exhaust from blowing back into the air intake. This has two serious drawbacks. First, it traps exhaust gas between the rotary valve and the poppet valve at the end of the exhaust stroke. As the trapped gas has to be ingested back into the cylinder on the intake stroke, the amount of fresh charge drawn into the cylinder per cycle is reduced. Secondly, in many instances the diverter valve consists of a rotary valve designed to run at half engine speed and as such the inlet port cannot fully open until well into the intake stroke and exhaust port has to commence closing before the end of the exhaust stroke. With the passage rotating it is impossible to attain full passage opening throughout either intake or exhaust strokes and therefore turbulence and restricted flow cannot be avoided. Moreover, the passage arrangement through most of these rotary valves, even when fully open, would seem to impose serious flow restrictions. All of the above factors tend to negate the advantage gained by the large single poppet valve.

To overcome some of the foregoing disadvantages applicant herein disclosed in his aforementioned U.S. Pat. No. 4,372,259 a specially devised diverter valve, in conjunction with fuel injection and a supercharger driven by an exhaust turbine, to create a combined system that would:

(a) minimize the flow friction to and from the cylinders;

(b) purge the exhaust gas; and (c) recover as much thermal energy from the exhaust as economics and the state of the art permitted.

The diverter valve consisted of a two-position spoon shaped valve that alternately connects the poppet valve port to the inlet and exhaust manifolds. It serves the same function as the rotary "distributor" valve in the prior art. The design objective was to give the smoothest unrestricted flow with minimum turbulence. The arrangement and timing was arranged to give full flow through the entire intake stroke and almost all of the exhaust stroke and the mechanism was timed to permit a short purge at the end of the exhaust stroke.

Fuel injection, as opposed to carburation, should be used and injected preferably directly into the cylinders, as purging with fuel-laden air would waste fuel and create problems of flashback and hydrocarbon pollution.

To achieve the purge function, it is necessary to maintain a higher pressure on the inlet side of the diverter valve than the back pressure from the exhaust manifold—hence a supercharger was used to prevent exhaust gases from entering the intake and elmininated the need for a perfect seal on the diverter valve.

An object of the present invention is to provide an arrangement in the foregoing type of internal combustion engine wherein purging is improved and construction of the diverter valve mechanism simplified.

SUMMARY OF INVENTION

To achieve the foregoing object, there is provided in accordance with the foregoing, a separate small passageway in parallel flow relation with the intake air into the combustion chamber which directs supercharged air to flow into the cylinder when the diverter valve is in an exhaust position. In one embodiment the separate small passageway is closed by the poppet valve when the latter is seated on the valve seat.

Figure 1:
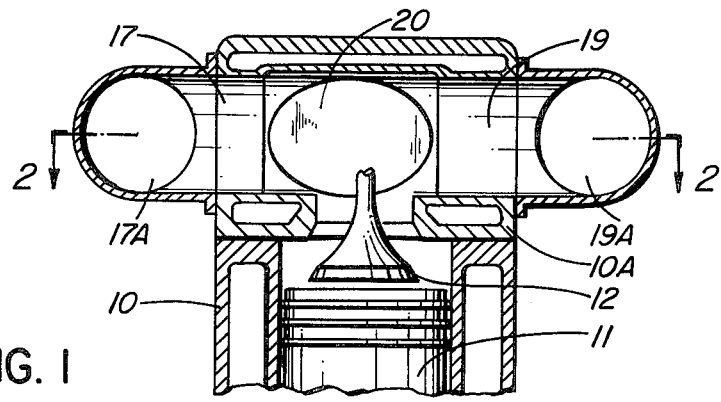
FIG. 1 is a side, partial sectional view of a one-cylinder internal combustion engine disclosed in applicant's earlier referred to issued patent, taken along line 1—1 of FIG. 2.
Figure 2:
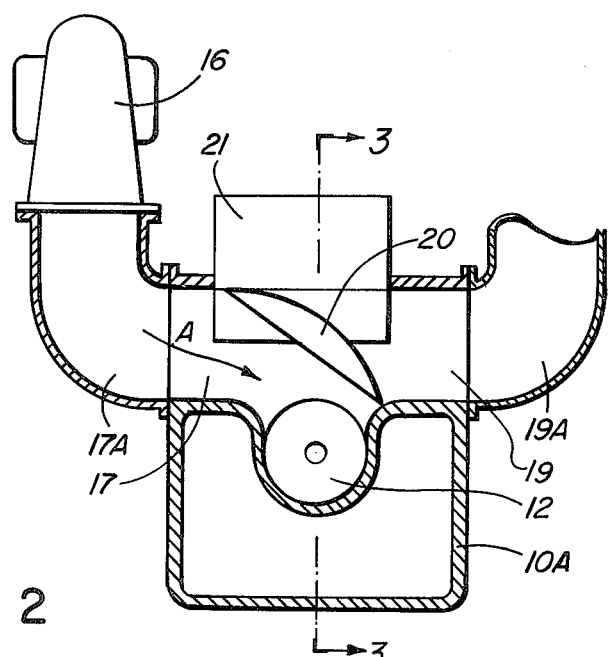
FIG. 2 is a top, partial sectional view of FIG. 1 taken along line 2—2 of FIG. 1.
Figure 3:
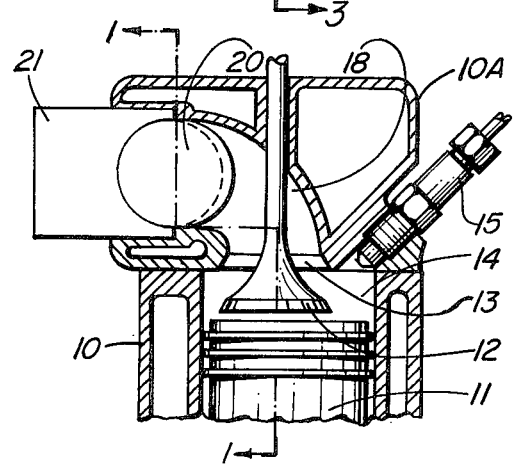
FIG. 3 is a sectional view, taken along line 3—3 of FIG. 2.

Referring to the drawings, there is illustrated in FIGS. 1, 2 and 3 a portion only of a single cylinder internal combustion engine which includes a block 10, a cylinder head 10A, a piston 11 and a single poppet valve 12, movable into and out of sealing contact with a valve seat 13 by a conventional cam operated mechanism (not shown). Fuel for the combustion engine is fed in appropriate timed relation into the combustion chamber 14 by an injector 15 of conventional design and operated in a conventional manner known to those skilled in the art. Air for combustion, pressurized by a turbo charger 16 driven by exhaust gases from the engine, flows in the direction of A (see FIGS. 2 and 4) in an inlet passage 17 through a passage 18 into the combustion chamber. Exhaust gases flow out from the combustion chamber, through the passage 18 and through a passage 19 which is a continuation of passage 17. In a multi-cylinder engine, inlet passages 17 are connected to a common header 17A (see FIGS. 1 and 2) and exhaust passages or outlets 19 are connected to a common header 19A. A spoon shaped diverter valve 20 is located at the junction of passages 17 and 19 opposite passage 18. The diverter valve 20 is a part of a diverter valve mechanism identified in general in the drawings by reference numeral 21. The diverter valve mechanism consists essentially of five parts, namely, an enclosed box or casing 22, pusher links 23, a yoke 24, a compression spring assembly 25, and the diverter valve 20. The pusher links 23 are connected to one end of a pair of arms 27 by pivot pin 28 and the other end of the arms are connected to rotate with a shaft 29 which is journalled in walls of the casing 22. The arms 27 are rocker arms for reciprocating the pusher mechanism and are oscillated back and forth about the axis of shaft 29 by a cam mechanism (not shown) acting on crank arm 29A. The cam mechanism is driven, in any convenient manner, in timed relation to rotation of the engine crankshaft. The enclosed box or casing 22 is detachably mounted in a recess in the head 10A of the engine in which passages 17, 18 and 19 are located. The closure box is detachably mounted by studs 32 passing through respective ones of a plurality of apertures in the bottom wall of the casing. The underside of such bottom wall is concave to conform to the diameters of the respective intake and exhaust passages or ports 17 and 19. One or more holes 33 in the bottom wall of the casing provide air passage means from passage 17 into the interior of the casing whereby the latter is pressurized by the incoming supercharged combustion air, when the diverter valve is in the intake position.

The diverter valve 20 has a structure on the rear face thereof on which there is located a pair of spaced apart lugs which provide means for pivotally mounting the diverter valve on the enclosed box by way of shafts 36 projecting from respective ones of opposed side walls of the casing. The casing 22 provides support structure for a common pivot axis for both the diverter valve 20 and the yoke. The diverter valve when flipped about the pivot axis alternately seals the intake and exhaust ports 17 and 19.

The yoke 24 provides the means to flip the diverter valve through the over-centre action of the compression spring 25. The yoke 24 is driven by the engine by the cam-operated rocker 27 via the pusher links 23 so as to operate in timed relation with rotation of the engine's crankshaft. The pusher 23 is pivotally connected to the yoke 24 by pivot pin 30. When the pusher (as viewed in FIG. 4) is driven to the right by the rocker arm, diverter valve is in the exhaust position and when the pusher is pulled back to the left, the diverter valve is in the intake position.

Figure 4:
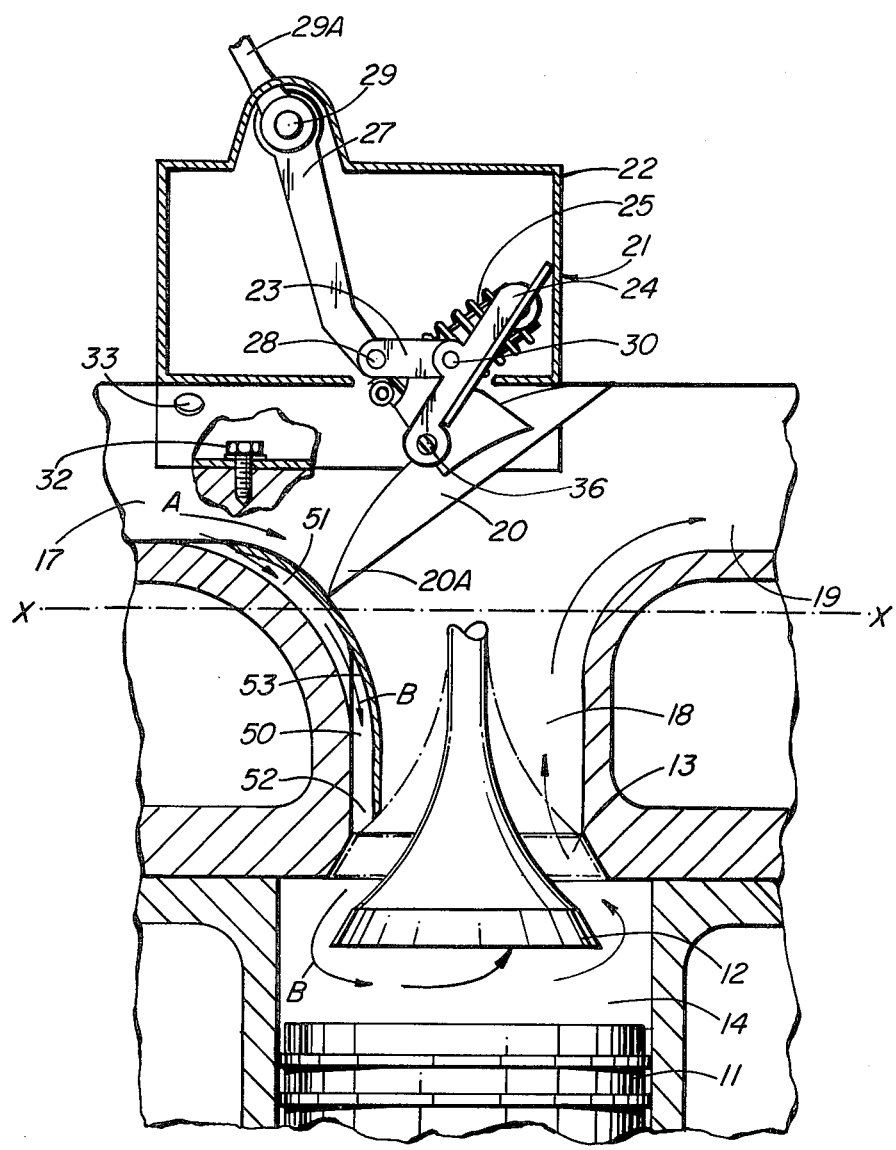
FIG. 4 is an enlarged partial sectional view illustrating one embodiment of the present invention, the portion of the drawing above line X—X being in a plane that is at an acute angle to the plane below such line.

The compression spring 25 is fitted over a variable length spring guide and the over-center action of the spring assembly rapidly and positively flips the diverter valve from one position to the other when the yoke is moved by the pusher. Effectively the spring pressure creates two stable positions for the diverter valve, one being the intake position (see FIG. 2) and the other the exhaust position (FIG. 4).

The general shape of the diverter valve 20 is that of a spoon with the handle cut off. The form of its convex rear face is such it fits tangentially to the concave wall of either manifold passage 17 and 19 along one rim, while the opposite edge conforms to the sectional shape of the transition curve from the valve passage 18 to the other manifold passage so as to effectively block that passage. In form, the shape of the rim approximates two halves of an ellipse cut along the minor diameter, with two straight sections added so as to lengthen the major diameter.

In applicant's aforementioned patent, purging is effected by having the diverter valve partially open in the exhaust position to allow inflow of air into the common passage 18 near the end of the exhaust stroke and while the poppet valve is open. To accomplish a more positive purge there is provided a small secondary air flow passage 50 that is in parallel air flow relationship with the inlet passage 17 and passage 18. The passage has respective inlet and outlet ends 51 and 52 and an outer wall 53 engaged by the edge 20A of diverter valve 20 when the diverter valve is in the exhaust position. With the poppet valve 12 open for exhaust, pressurized air flows through the passage 50 as indicated by the arrows B into the combustion chamber and out through the valve opening to the exhaust passage. When the poppet valve is closed, the passage outlet 52, in the embodiment illustrated in FIG. 4, is covered and sealed off by the poppet valve. The valve is shown in broken line in its closed position. In FIG. 4 these may be high pressure air lines timed to inject air in relationship with the engine.

Figure 5:
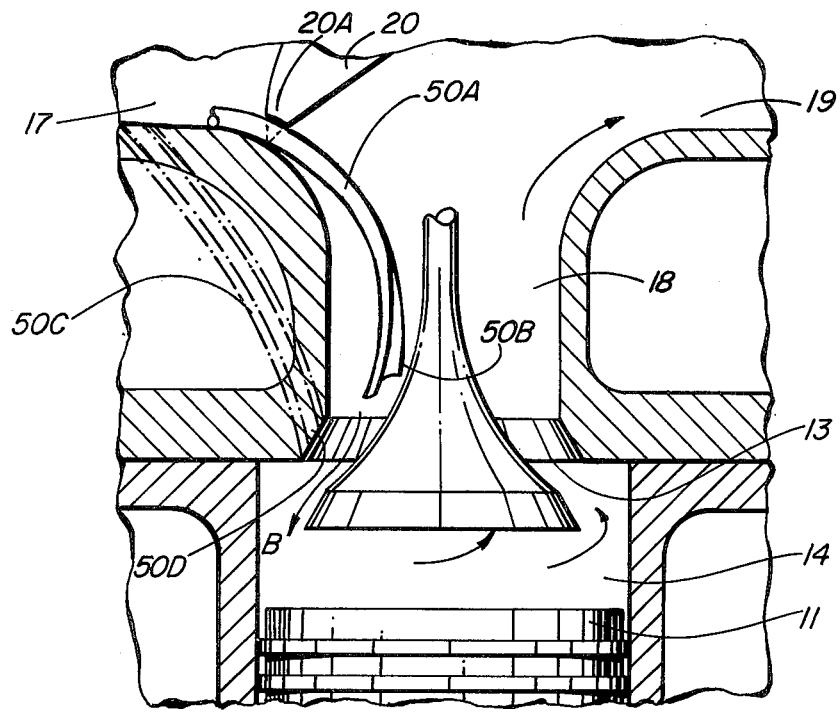
FIG. 5 is similar to FIG. 4 illustrating a modified embodiment.

In FIG. 5 there are illustrated two different embodiments providing a secondary air flow passage 50. In one embodiment there is provided a separate conduit 50A mounted on the internal surface of the main passage and having a discharge outlet end 50B, the tube being flattened at such end to direct the inflowing air in the secondary passage into the combustion chamber along the side of the valve. In the second embodiment, in place of conduit 50A there is provided a conduit 50C illustrated in broken line, passing through the intake manifold and terminating in a discharge outlet end 50D in the valve seat 13, or alternatively directly in the combustion chamber in which case a back flow preventing valve should be installed at some place in the line. When utilizing the conduit 50A, diverter valve 20 is notched as indicated at 20A to fit over and sealingly engage the outer surface of the conduit.

While the foregoing has been described with reference to a particular diverter valve, it will be obvious to those skilled in the art the secondary air passage may be used with any diverter valve. Also, the secondary passage, if desired, may be used to inject a combustion stabilizer into the combustion chamber on the intake stroke thereof. For example, the injector 15 may be used to inject hydrogen and the secondary passage 50 may be connected by way of a conduit to an injection system for injecting water into the combustion chamber. If desired, a combustion stabilizer and/or combustible fuel may be directly injected into the primary air inlet passage.

In FIG. 4 of the drawings, for the sake of clarity and illustration, it should be pointed out the portion of FIG. 4 above line X—X is in a plane disposed at an acute angle to the plane of the lower portion of the drawing. Obviously, if the arrangement were otherwise, the valve stem of the poppet valve would interfere with the diverter valve mechanism. Since the passages are circular in cross-section, the diverter valve mechanism can be rotated and positioned at a place around the passage where it is offset to avoid interference from the valve stem.

In the foregoing, supercharged air has been described as a means for causing air to flow through the small secondary passage into the combustion chamber for purging. Obviously a small high pressure air pump could be used particularly with the embodiment using a tube illustrated in FIG. 5.

I claim:

1. In a fuel injected, internal combustion engine of the type having a single poppet valve for controlling the flow of air to the combustion chamber and exit of exhaust gases therefrom, an inlet passage for the supply of air under pressure; an outlet passage for exit of exhaust gases, said outlet passage communicating with said inlet passage as a continuation thereof; a further passage terminating at one end in said combustion chamber and at the other end at the junction of said inlet and outlet passages, said single poppet valve being arranged and operated to control the flow of gases through said further passage into and out of said combustion chamber in timed relation to rotation of the engine's crankshaft, all of said passages being circular in cross-sectional shape; a diverter valve selectively movable in timed relation with opening and closing of the poppet valve so as in one position to direct flow of pressurized air through the inlet passage into the combustion chamber and later, in another position, the flow of combustion gases from the combustion chamber through the outlet passage; and means controlling movement of said diverter valve from each of one position to another, the improvement comprising a secondary air passage to said combustion chamber in parallel flow relation with said inlet passage and arranged such that air flows therethrough into the combustion chamber when the diverter valve is in the exhaust position and the poppet valve is open.

2. The improvement as defined in claim 1 wherein said secondary passage is closed by the poppet valve when the latter is in a seated closed position.

* * * * *